July 16, 1968 W. C. JONES 3,393,053
GAS ANALYZER
Filed Aug. 17, 1964 2 Sheets-Sheet 1
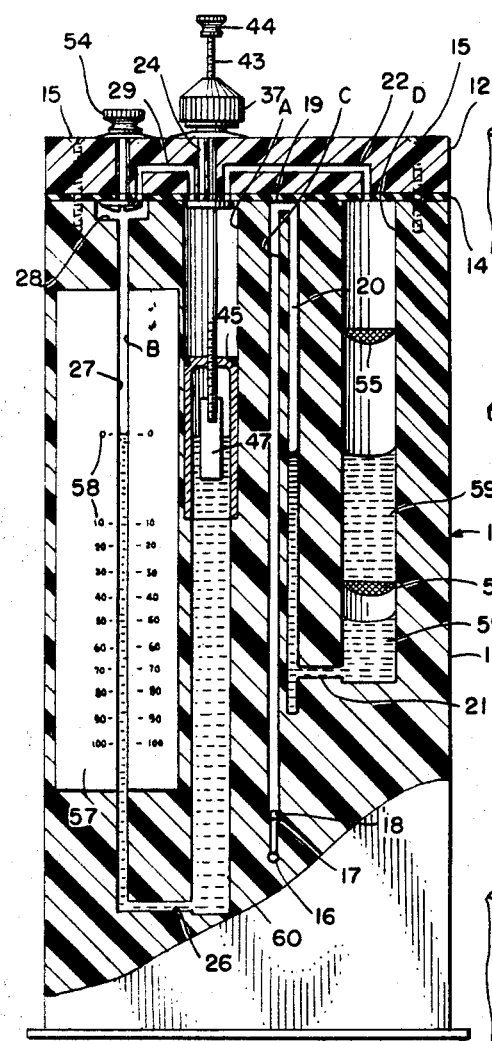
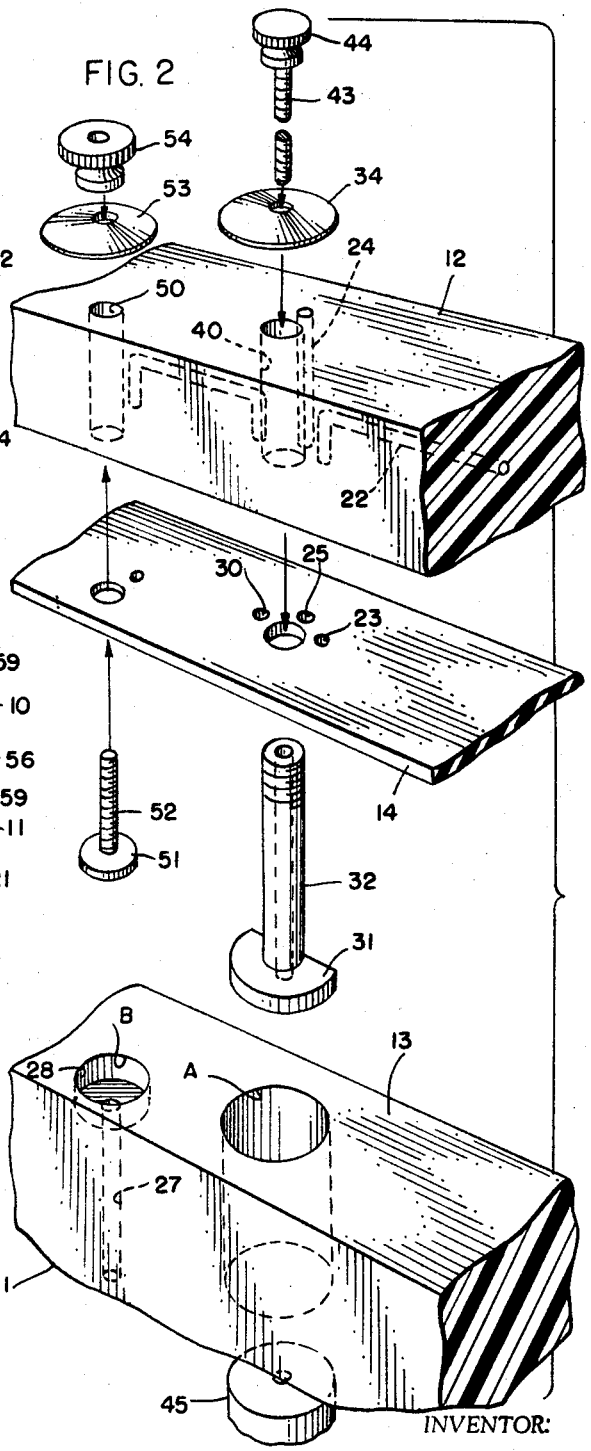
INVENTOR:
WILLIAM C. JONES
BY
Dawson, Tilton, Fallon, Lungmus & Alexander
ATT'YS

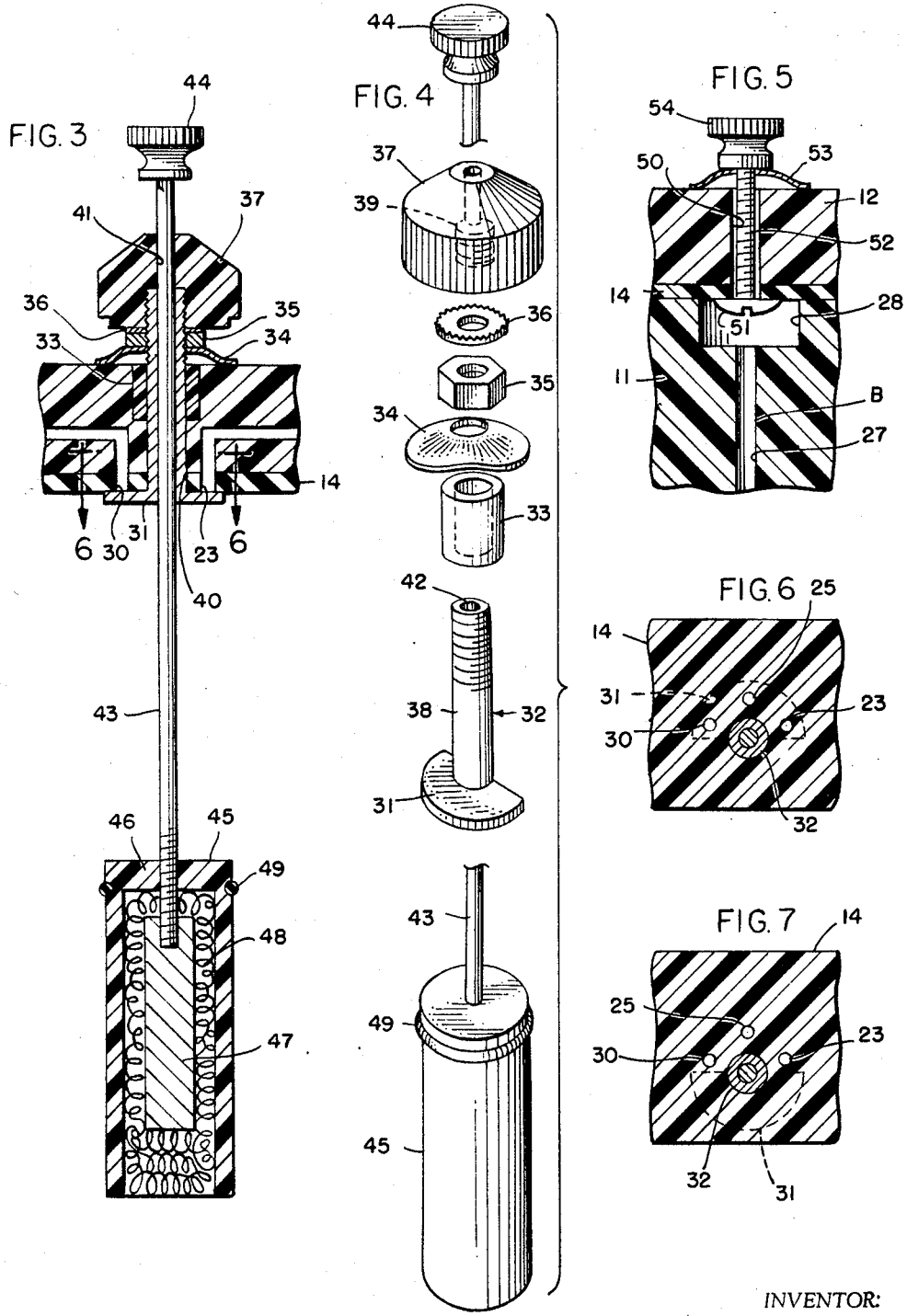

United States Patent Office 3,393,053
Patented July 16, 1968

3,393,053
GAS ANALYZER
William C. Jones, 16 W. 328 Walnut Lane,
Timber Trails, Elmhurst, Ill. 60126
Filed Aug. 17, 1964, Ser. No. 390,021
9 Claims. (Cl. 23—254)

ABSTRACT OF THE DISCLOSURE

A gas analyzer for determining relative amounts of carbon dioxide in expired air. A transparent body is provided with a vertical gas-liquid mixing cylinder and a vertical gas pressure measuring chamber. A pressure equalization passage connects the upper ends of the mixing cylinder and the measuring chamber, and an exhaust passage and an inlet passage also communicates with the upper end of the mixing cylinder. A valve is rotatably mounted in the transparent body at the upper end of the mixing cylinder and is operable to selectively close all of the passages or open all of the passages. A mixing plunger is slidably disposed within the mixing cylinder, and the plunger is provided with a rod which extends through the top of the transparent body.

---

This invention relates to a gas analyzer, and more specifically, to a device for making a relative determination of the amount of carbon dioxide in air expired from the lungs.

An important object of the present invention is to provide a device for use in analyzing the carbon dioxide content of expired air, such device, unlike prior equipment used for the same purpose, being relatively compact, inexpensive, and simple to operate. Another object is to provide a gas analyzer which requires only small amounts of expired air for its operation and which therefore may be used to run several tests with the volume of air expired from a subject in a single breadth. In this connection, it is an additional object to provide a device which may be quickly and easily operated to run successive tests in a short interval of time.

Another object is to provide a device for analyzing the carbon dioxide content of expired air which is provided with means for insuring accuracy and reproducibility of results. It is also a specific object to provide a testing device equipped with means for checking an operator's technique, the operation state of the equipment and accuracy of the $CO_2$ gas concentration that is to be rebreathed.

Other objects will appear from the specification and drawings in which:

FIGURE 1 is a side elevational view of the gas analyzer, the structure being shown largely in section to illustrate the flow passages and chambers thereof;

FIGURE 2 is an enlarged broken and exploded perspective view of the valve construction of the device;

FIGURE 3 is an enlarged broken sectional view illustrating the device's valve and plunger construction;

FIGURE 4 is an enlarged exploded perspective view of the valve and plunger assembly;

FIGURE 5 is an enlarged vertical and broken sectional view illustrating the valve element for the gas pressure measuring chamber;

FIGURE 6 is an enlarged broken sectional view taken along line 6—6 of FIGURE 3 and showing the valve in its closed position;

FIGURE 7 is an enlarged horizontal sectional view similar to FIGURE 6 but showing the valve in its open position.

In the embodiment of the invention illustrated in the drawings, the numeral 10 generally designates a transparent plastic body having formed therein a vertical gas-liquid mixing cylinder A, a gas pressure measuring chamber B, a vertical flow rate passage C, and a vertical humidification chamber D. All four chambers and passages extend vertically and are disposed in side-by-side relation.

The transparent body 10 is preferably formed in two sections: a relatively large lower section 11 and a smaller upper section 12. All four passages and chambers A–D are formed in the lower section and open into the flat horizontal top face 13 of that section. A sealing gasket 14 formed of neoprene or some other resilient material is interposed between the flat opposing surfaces of the upper and lower sections and, as illustrated in FIGURE 1, the two sections are tightly secured together by screws 15 or by some other suitable means.

All of the chambers and passages A–D are in axial series flow communication with each other. Since the test reaction performed within the device is carried within mixing cylinder A, the passages and chambers which convey gas to that cylinder are considered as being part of an inlet passage system. Tracing the passages and chambers as illustrated in FIGURE 1, the inlet system includes an inlet opening 16 which communicates with the atmosphere through the lower side wall portion of the body. Extending upwardly from the inlet opening is flow rate passage C which, in the illustration given, is substantially straight and of uniform diameter above shoulder 17. Below the shoulder, the passage is constricted slightly to retain a free-floating flow rate indicating member 18 within the flow rate passage. The indicating member 18 may be in the form of a small metal ball having a diameter substantially less than the diameter of passage C.

At the upper end of the vertically elongated flow rate passage C is a bridging passage 19 which communicates with downwardly-extending connecting passage 20. The connecting passage in turn communicates at its lower end with the vertically elongated humidification chamber D by means of a short bridging passage 21.

In the upper section 12 of the transparent body is a linking passage 22 which communicates with the upper ends of both the humidification chamber D and the mixing cylinder A. It will be noted that the linking passage extends through the resilient membrane or gasket 14, terminating in a valve opening 23 in the gasket which communicates directly with the mixing cylinder at the upper end thereof.

Also communicating with the upper end of the mixing cylinder and extending through the upper section 12 of the body is an exhaust passage 24. The exhaust passage is open to the atmosphere at its upper end and, at its lower end, extends through gasket 14 to define a second valve opening 25.

The vertically elongated mixing cylinder A is in direct communication with the vertical gas pressure measuring chamber B by means of a lower communicating passage 26. It will be observed that the gas pressure measuring chamber B has a vertically elongated lower portion 27 which is of uniform diameter throughout its entire vertical extent and which is substantially smaller in its cross sectional dimensions than any portion of the relatively large mixing cylinder A. However, at its uppermost end, the measuring chamber B is provided with an enlarged upper portion 28 and this enlarged portion is in direct communication with the upper end of the mixing cylinder by means of connecting passage 29. Like linking passage 22, connecting passage 29 is located within upper body section 12 and extends through gasket 14 to define a third valve opening 30 in the gasket and communicating directly with the mixing cylinder. All three valve openings 23, 25, and 30 are therefore located in close proximity and within a semi-circular area at the upper end of cylinder or chamber A. Such openings are opened and closed as a group by the head 31 of valve member 32 which is illustrated most clearly in FIGURES 2, 3, and 4.

The valve member 32 is part of a valve assembly which includes gasket or sealing member 14, resilient sealing collar 33, spring element 34, locking nut 35, locking washer 36, and operating knob or handle 37.

The head 31 of valve member 32 is semi-circular in shape and is provided with a smooth flat upper surface which sealingly engages the underside of gasket 14. Extending upwardly from the valve head is the integral tubular shank or shaft portion 38 of the valve member which, as revealed in FIGURES 3 and 4, is externally threaded at its upper end to be secured within the internally threaded axial opening 39 of knob 37. The hollow shaft portion 38 of the valve member extends upwardly through a vertical bore 40 in the upper body section. The upper portion of the bore is enlarged to contain sealing collar 33 which is preferably formed of tetrafluoroethylene and fluorinated ethylpropylene resins, or any other resilient plastic materials which will form an effective fluid-tight seal with the smooth outer surface of the valve's shaft portion 38.

The lock nut 35 and washer 36 anchor the knob 37 securely upon the upper threaded end of shaft portion 38. Spring 34, interposed between the upper surface of body 11 and the undersurface of locking nut 35, urges the knob and valve member upwardly to insure a fluid-tight sealing engagement between the upper surface of valve head 31 and the undersurface of the perforated gasket 14.

Upon rotation of knob 37, valve member 32 may be shifted between a first or open position (FIGURE 7) when all three valve openings 23, 25, and 30 are in open communication with the mixing cylinder A, and a second or closed position (FIGURE 6) when the three valve openings are all closed by the head 31 of the valve member.

Knob 37 is provided with a bore 41 extending vertically therethrough and in direct axial alignment with the bore 42 of valve shaft 38. A rod 43 of a plunger assembly slidably extends through the aligned bores of the knob and valve member. As shown in FIGURES 1, 3, and 4, the plunger assembly includes rod 43, actuating knob 44 at the upper end of the rod, and plunger 45 threadedly secured to the lower end portion of the rod. In its preferred form, plunger 45 is of hollow cylindrical shape and is open at its bottom. The top wall 46 of the plunger threadedly receives the lower portion of the rod so that upon rotation of knob 44 and rod 43 with respect to the plunger, the plunger will be shifted in an axial direction. To the extreme lower end of the rod is secured a cylindrical plug 47 of substantially smaller external diameter than the plunger's internal diameter, and between the plug and the inside surfaces of the plunger is a packing 48 of wooly metallic fibers. A resilient annular ring 49 extends about the outer surface of the plunger and, as shown in FIGURE 1, sealingly engages the wall of the cylinder to wipe liquid therefrom without at the same time preventing the passage of gas between the cylinder wall and the outer surface of the cylindrical plunger. With the exception of ring 49, plunger 45 is of sufficiently smaller diameter than the diameter of the cylinder so as to define a small but definite air space therebetween.

Referring to FIGURES 1, 2 and, in particular, FIGURE 5, it will be seen that the upper section 12 of the plastic body is provided with a vertical air entry passage 50 which communicates with the atmosphere at its upper end and with the upper portion 28 of the gas pressure measuring chamber B at its lower end. The head 51 of a bolt 52 is disposed within the enlarged upper portion of chamber B and constitutes a valve member for closing and opening passage 50. Normally, the passage is closed by reason of the upward force exerted by spring 53 against button 54, the button being secured to the upper end of the shank of bolt 52 above spring 53. Since the shank of the bolt is substantially smaller in diameter than passage 50, depression of button 54 to unseat the valve member 51 opens the gas pressure measuring chamber to atmospheric pressure.

The humidification chamber D is of relatively large diameter and contains a pair of axially-spaced fine-mesh screens 55 and 56 therein. Both screens are located within the intermediate portion of the vertically-extending chamber and may be cemented or secured therein by any suitable means.

Imbedded within, or secured to the backside of, the lower transparent body section 11 is a suitable scale sheet 57. As shown in FIGURE 1, the scale sheet is disposed behind the gas pressure measuring chamber and is provided with scale markings 58 which, in the form shown in the drawings, represents the carbon dioxide content of gas in terms of millimeters of mercury of gas found in the blood. If desired, an absolute scale for testing or checking purposes may also be provided.

In operation of the device, a small amount of expired air is forced into the system through inlet opening 16. Such air may first be collected in a collapsible bag of the type disclosed in my co-pending application Ser. No. 390,132, filed Aug. 17, 1964, now United States Patent No. 3,321,976, and a small amount of the collected air may then be transferred to the device by squeezing the bag slightly and forcing the air through a suitable plug-in fitting received within inlet 16. The compressive force applied to the bag is controlled so that flow rate member 18 maintains any position above 17 within flow rate passage C. The collected gas passes through the flow rate passage and into the humidification chamber where it bubbles through water 59. Screens 55 and 56 restrain the water as the gas bubbles therethrough and prevent the water from passing into cylinder A.

The introduction of gas into the system occurs with valve member 32 rotated into its open position, that is, the position illustrated in FIGURE 7. Therefore, the gas, after bubbling through the humidification chamber, will pass into the upper portion of cylinder A (the plunger 45 being in the lowered position shown in FIGURE 1) and then flows out of the cylinder through exhaust passage 24. It is important that the gas flow through the upper portion of the cylinder with sufficient velocity to create turbulence and to force previously-tested gas out through the exhaust passage. It is for this purpose that the flow rate indicator 18 and flow rate passage C are primarily provided. If the collected gas is introduced into the system with sufficient velocity, as indicated by flow rate indicator 18, and for a sufficient interval of time (normally five seconds), it will be found that the gas remaining from prior testing will be thoroughly flushed from cylinder A and, after the flushing operation, the only gas within the cylinder will be that which has just been introduced into the system.

After the flushing step, the valve member 32 is rotated into its seated position closing valve openings 23, 25 and 30, and the gas trapped within the cylinder is mixed or washed with the liquid 60 contained in the cylinder's lower portion. This liquid will normally be potassium hydroxide which is capable of selectively absorbing the carbon dioxide component of the gas introduced into the system. The mixing or washing operation is performed simply by moving knob 44 upwardly and downwardly a selected number of times (normally five or six times). The gas trapped within the cylinder slips by the upwardly moving piston and intimately mixes with the agitated liquid. During the down stroke, the gas returns to the upper portion of the cylinder and ring 49 wipes the liquid from the cylinder wall.

At the commencement of the testing procedure, the liquid within the mixing cylinder A and the measuring chamber B should be at the same level, and such equalization is insured because of the inter-communicating gas equalization passage 29. Also, at the commencement of the testing procedure, the liquid level should be in alignment with the zero marking on scale 58. If it is not, suitable adjustment may be made by rotating knob 44 to elevate or lower plug 47 until the proper liquid level is achieved.

After the mixing or washing step, the absorption of carbon dioxide by the potassium hydroxide creates a negative pressure within the cylinder and this negative pressure is reflected in an elevating of the liquid level within the cylinder and a lowering of the level within measuring chamber B. The extent of lowering of the level within the measuring chamber is directly proportional to the amount of carbon dioxide in the gas being tested. To magnify this lowering action, and to increase the readability and accuracy of the test, an operator simply depresses button 54 to open the upper portion of the measuring chamber to atmospheric pressure, thereby relieving the negative pressure within that chamber and substantially increasing the extent of depression of the liquid level therein. The operator then simply reads the liquid level within the measuring chamber B off of scale 58, the scale being calibrated in terms of millimeters of mercury of blood gas carbon dioxide.

While a full explanation of the structure and operation of the device cannot be given quickly, the actual testing procedure may be performed rapidly by even a relatively inexperienced operator. It has been found that from the time gas is introduced into inlet 16, the amount of time which elapses before a reading is taken off of scale 58 seldom exceeds fifteen seconds. A series of three tests may therefore be run in about one minute assuming that the gas for all three tests is obtained from the same breathing bag.

While in the foregoing I have disclosed an embodiment of the invention is considerable detail for purposes of illustration, it will be understood by those skilled in the art that many of these details may be varied without departing from the spirit and scope of the invention.

I claim:

1. In a gas analyzer for determining relative amounts of carbon dioxide in expired air, a transparent body having a vertical gas-liquid mixing cylinder therein and having a vertically elongated gas pressure measuring chamber adjacent to said cylinder and communicating with the same adjacent the lower end thereof, inlet passage means provided in said body and communicating with said cylinder at the upper end thereof, exhaust passage means provided in said body and also communicating with said cylinder at the upper end thereof, pressure equalization passage means extending through said body and communicating with both said cylinder and said gas pressure measuring chamber at the upper ends thereof, valve means movably mounted within said body adjacent the upper end of said cylinder and operatively associated with all of said passage means for closing the same when said valve member is in a first position and for opening all three passages when said member is in a second position, a mixing plunger slidably disposed within said cylinder, and handle means connected to said plunger for shifting the same longitudinally within said cylinder when said valve means is in its first position.

2. The structure of claim 1 in which said valve means includes a rotatable valve member disposed within said cylinder at the upper end thereof, an operating shaft projecting upwardly through said body and secured at its lower end to said valve member, an operating knob attached to the upper end of said shaft externally of said body for manually rotating said valve member, and spring means urging said valve means upwardly to urge said member into sealing engagement with said valve body at the upper end of said cylinder.

3. The structure of claim 2 in which said handle means for said plunger includes an upwardly extending operating rod, said shaft and knob of said valve means being hollow and said rod slidably extending upwardly therethrough.

4. The structure of claim 3 in which said rod is threadedly secured to said plunger for relative axial movement when the plunger and rod are rotated with respect to each other.

5. The structure of claim 1 in which said inlet passage means includes a vertical flow rate passage having a free flow indicator member disposed therein and of a size substantially smaller than the diameter of said passage, the upper end of said flow rate passage communicating with said cylinder and the lower end of said passage communicating with the atmosphere, whereby, when gas flows through said flow rate passage toward said cylinder said flow rate indicator tends to float on the upwardly flowing gas to indicate the relative rate of flow thereof.

6. The structure of claim 5 in which a vertically-elongated humidification chamber is interposed along said inlet passage means between said flow rate passage and said cylinder, said humidification chamber being adapted to contain a quantity of water and having disposed transversely therein at least one fine-mesh screen for restraining the upward flow of water as gas is bubbled therethrough.

7. In a gas analyzer for measuring carbon dioxide in expired air, a transparent body having upper and lower sections secured together with a resilient gasket therebetween, a vertical gas-liquid mixing cylinder and a vertical gas pressure measuring chamber located in said lower section, said cylinder and chamber being disposed in side-by-side relation and communicating with each other adjacent the lower ends thereof, inlet passage means communicating with said cylinder at the upper end thereof, exhaust passage means provided in said body and also communicating with said cylinder at the upper end thereof, pressure equalization passage means extending through said body and communicating with both said cylinder and said gas pressure measuring chamber at the upper ends thereof, said passage means all communicating with the upper end of said cylinder through three adjacent valve openings in said gasket, and a valve member rotatably mounted within the upper portion of said cylinder and slidably and sealingly engaging said gasket for opening and closing all of said valve openings.

8. The structure of claim 7 in which said inlet passage means includes a vertically-elongated flow rate passage having a free flow indicating member disposed therein and of a substantially smaller diameter than the diameter of said passage, the upper end of said flow rate passage communicating with said cylinder and the lower end of said passage communicating with the atmosphere, whereby, when gas flows upwardly through said flow rate passage towards said cylinder, said indicator member tends to float within said passage to indicate the rate of gas flow therethrough.

9. The structure of claim 8 in which a vertically-elongated humidification chamber is interposed along said inlet passage means between said flow rate passage and said cylinder, said humidification chamber being adapted to contain a quantity of water and having disposed transversely therein at least one fine-mesh screen for restraining the upward flow of said water as gas is bubbled therethrough.

References Cited

UNITED STATES PATENTS

| | | | |
|---|---|---|---|
| 1,285,927 | 11/1918 | Butcher | 23—254 |
| 1,719,593 | 7/1929 | Cunningham | 23—254 |
| 2,357,638 | 9/1944 | Dwyer | 23—254 |

MORRIS O. WOLK, *Primary Examiner.*

JOSEPH SCOVRONEK, *Examiner.*

S. MARANTZ, *Assistant Examiner.*